(12) United States Patent
Saito

(10) Patent No.: US 11,598,961 B2
(45) Date of Patent: Mar. 7, 2023

(54) DISPLAY APPARATUS CAPABLE OF REDUCING LUMINANCE UNEVENNESS AND COLOR UNEVENNESS

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/003,999

(22) Filed: Aug. 27, 2020

(65) Prior Publication Data

US 2021/0063739 A1 Mar. 4, 2021

(30) Foreign Application Priority Data

Aug. 29, 2019 (JP) .............................. JP2019-156902

(51) Int. Cl.
*G02B 27/01* (2006.01)
*G03H 1/02* (2006.01)

(52) U.S. Cl.
CPC ....... *G02B 27/0103* (2013.01); *G03H 1/0248* (2013.01); *G02B 27/0172* (2013.01); *G02B 2027/0107* (2013.01); *G02B 2027/0109* (2013.01); *G02B 2027/0174* (2013.01); *G02B 2027/0178* (2013.01); *G03H 2001/0216* (2013.01); *G03H 2223/23* (2013.01)

(58) Field of Classification Search
CPC ............ G02B 27/0103; G02B 27/0172; G02B 2017/0107; G02B 2027/0109; G02B 2017/0174; G02B 2017/0178; G03H 11/0248; G03H 2001/0216; G03H 2223/23

See application file for complete search history.

(56) References Cited

U.S. PATENT DOCUMENTS 5,898,511 A * 4/1999 Mizutani .................. G03H 1/26
359/13
6,788,442 B1 * 9/2004 Potin .................. G02B 27/0172
345/8

(Continued)

FOREIGN PATENT DOCUMENTS

| CN | 1892271 | 1/2007 |
|---|---|---|
| JP | 2006350129 | 12/2006 |
| JP | 2019133132 | 8/2019 |

*Primary Examiner* — Kwang-Su Yang
(74) *Attorney, Agent, or Firm* — JCIPRNET

(57) ABSTRACT

The display apparatus of the present disclosure includes an imaging light generating device and an optical system on which imaging light emitted from the imaging light generating device is incident. The optical system includes a first optical unit having positive power, a second optical unit having a positive power and including a first diffraction element, a third optical unit having positive power, and a fourth optical unit having positive power and including a second diffraction element forming an exit pupil, the first optical unit, the second optical unit, the third optical unit, and the fourth optical unit being aligned in order along an optical path of the imaging light. The second diffraction element is constituted of a volume hologram and has, in a cross-sectional view of the volume hologram, interference fringes continuously varying in pitch and inclination thereof from one end toward another end of the second diffraction element.

6 Claims, 5 Drawing Sheets

(56) References Cited

U.S. PATENT DOCUMENTS

| | | | |
|---|---|---|---|
| 7,502,168 B2* | 3/2009 | Akutsu | G02B 5/1861 |
| | | | 359/573 |
| 2006/0291021 A1 | 12/2006 | Mukawa | |
| 2009/0040580 A1 | 2/2009 | Mukawa | |
| 2016/0252742 A1* | 9/2016 | Wakabayashi | G02B 27/0103 |
| | | | 345/8 |
| 2018/0151194 A1* | 5/2018 | Noguchi | G11B 7/1353 |
| 2019/0235266 A1 | 8/2019 | Ide et al. | |

* cited by examiner

DISPLAY APPARATUS CAPABLE OF REDUCING LUMINANCE UNEVENNESS AND COLOR UNEVENNESS

The present application is based on, and claims priority from JP Application Serial Number 2019-156902, filed Aug. 29, 2019, the disclosure of which is hereby incorporated by reference herein in its entirety.

BACKGROUND

1. Technical Field

The present disclosure relates to a display apparatus.

2. Related Art

There is a known head-mounted display that is configured to guide imaging light to eyes of an observer while reflecting the imaging light by using a plurality of reflective elements. There is disclosed, in JP 2006-350129 A, a virtual image display apparatus including a light source, a collimator optical system, a scanning optical system, a light-guiding plate, a first reflection-type volume hologram grating provided in a light incident region of the light-guiding plate, and a second reflection-type volume hologram grating provided in a light emission region of the light-guiding plate. In the virtual image display apparatus, two pieces of the reflection-type volume hologram gratings are constant in pitch of interference fringes within the hologram, and the interference fringes continuously or stepwisely vary in inclination within the hologram.

In a display apparatus such as a head-mounted display or the like, an optical system including a diffraction element having positive power in front of the eyes of the observer is necessary to suppress luminance unevenness and color unevenness in an image. However, even a use of a diffraction element of JP 2006-350129 A having the interference fringes being constant in pitch and varying in inclination for this type of optical system cannot easily suppress the luminance unevenness and color unevenness in an image. In addition, when using a diffraction element having the interference fringes varying stepwisely in inclination, an issue arises that a streaky irregularity is visually recognized in an image at a boundary of a region in which the interference fringes vary in inclination.

SUMMARY

In order to resolve the above-described issue, a display apparatus of one aspect of the present disclosure includes an imaging light generating device, and an optical system on which imaging light emitted from the imaging light generating device is incident, wherein the optical system includes a first optical unit having positive power, a second optical unit having a positive power and including a first diffraction element, a third optical unit having positive power, and a fourth optical unit having positive power and including a second diffraction element forming an exit pupil due to the imaging light, the first optical unit, the second optical unit, the third optical unit, and the fourth optical unit being aligned in order along an optical path of the imaging light, in which the second diffraction element is constituted of a volume hologram and has, in a cross-sectional view of the volume hologram, interference fringes continuously varying in pitch and inclination thereof from one end toward another end of the second diffraction element.

In the display apparatus of one aspect of the present disclosure, the second diffraction element may have, in a front view of the volume hologram, interference fringes continuously varying in curvature radius thereof from the one end toward the other end of the second diffraction element.

In the display apparatus of one aspect of the present disclosure, the second diffraction element may have a first interference fringe corresponding to first light within a first wavelength band, a second interference fringe corresponding to second light within a second wavelength band that is different from the first wavelength band, and a third interference fringe corresponding to third light within a third wavelength band that is different from both the first wavelength band and the second wavelength band.

In the display apparatus of one aspect of the present disclosure, the second diffraction element may have a configuration, in which a first diffraction layer having the first interference fringe, a second diffraction layer having the second interference fringe, and a third diffraction layer having the third interference fringe are layered.

In the display apparatus of one aspect of the present disclosure, the second diffraction element may have a configuration, in which among the first interference fringe, the second interference fringe, and the third interference fringe, at least two of the interference fringes are superimposed within one diffraction layer.

In the display apparatus of one aspect of the present disclosure, the interference fringes may have a relatively large pitch on a side near the third optical unit and may have a relatively small pitch on a side far from the third optical unit.

In the display apparatus of one aspect of the present disclosure, the first diffraction element may have, in a cross-sectional view, interference fringes continuously varying in pitch and inclination thereof from the one end toward the other end of the first diffraction element.

In the display apparatus of one aspect of the present disclosure, on the optical path, a first intermediate image of the imaging light may be formed at a position between the first optical unit and the third optical unit, a pupil may be formed at a position between the second optical unit and the fourth optical unit, a second intermediate image of the imaging light may be formed at a position between the third optical unit and the fourth optical unit, and an exit pupil may be formed on an opposite side of the fourth optical unit from the third optical unit.

DESCRIPTION OF EXEMPLARY EMBODIMENTS

First Embodiment

Figure 1:
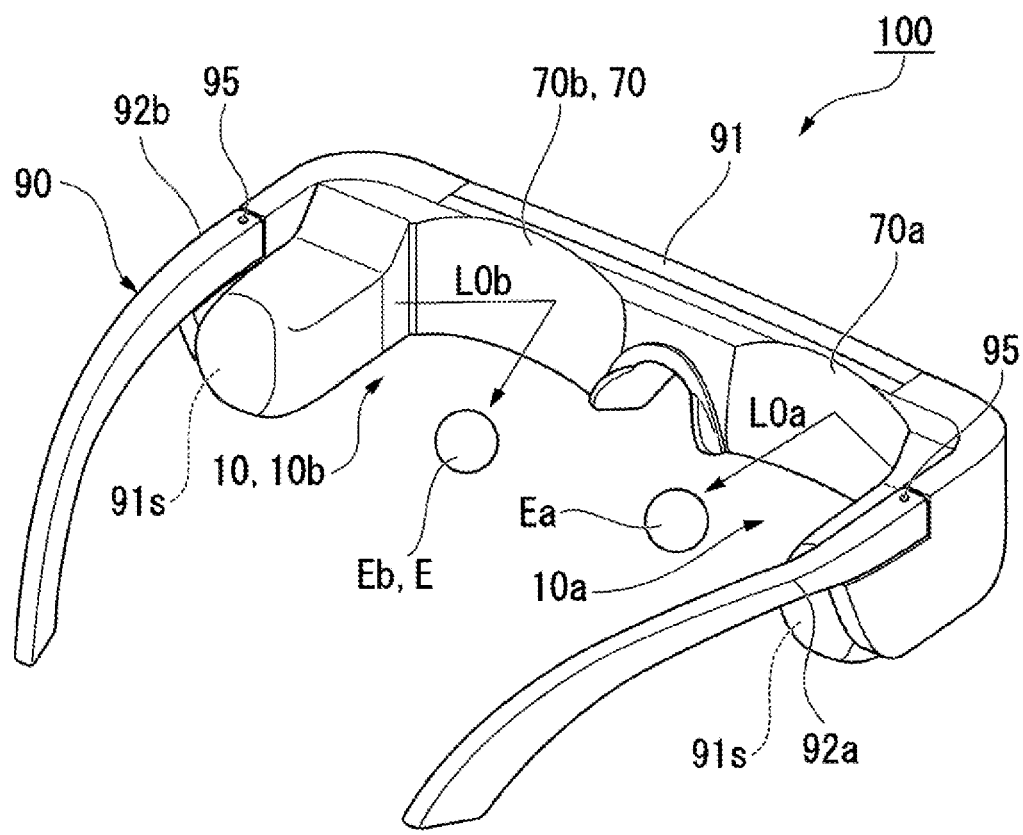
FIG. 1 is a perspective view illustrating an external view of a display apparatus of a first embodiment.
Figure 1:
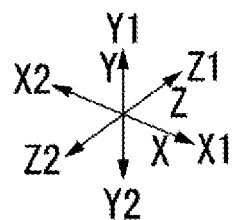

A first embodiment of the present disclosure will be described below with reference to FIGS. 1 to 6.

Note that, in the drawings, the dimensions of some constituent elements may be scaled differently for ease of understanding for the constituent elements.

Figure 2:
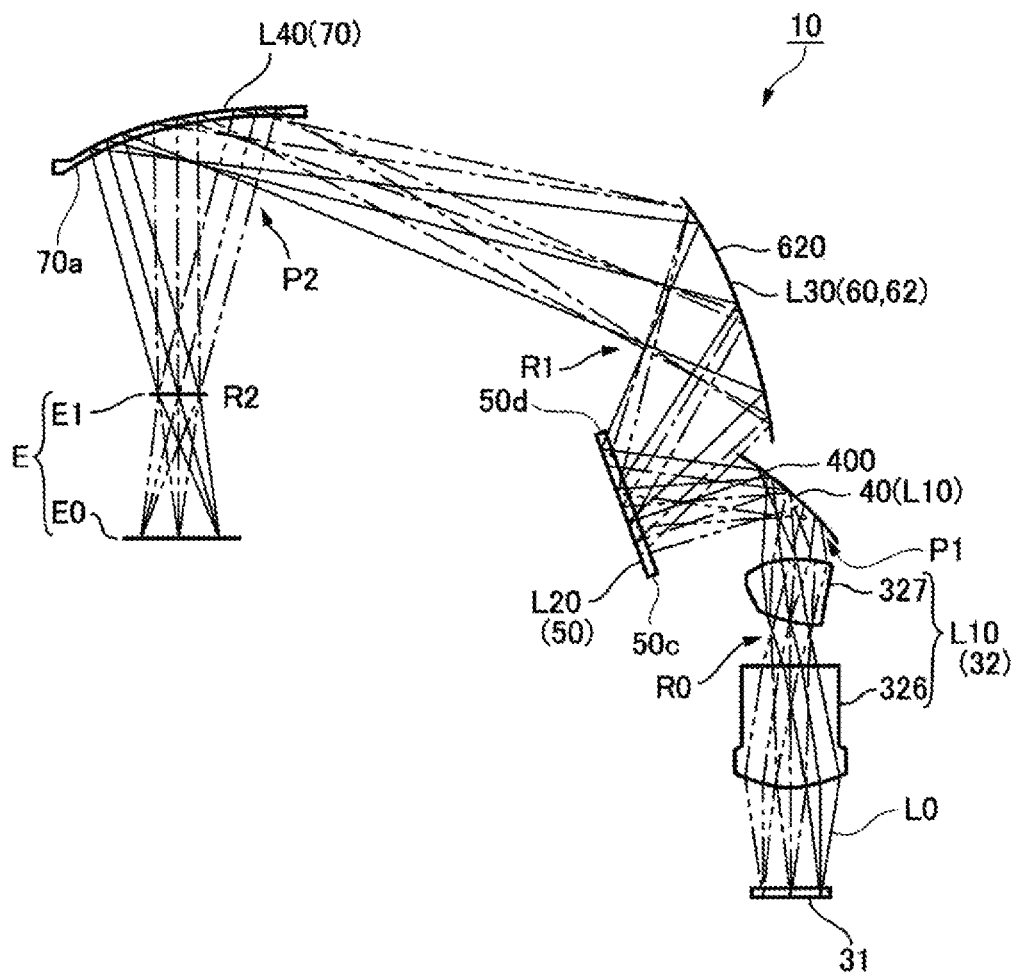
FIG. 2 is a diagram schematically illustrating a configuration of an optical system of a display apparatus.

FIG. 1 is a perspective view illustrating an external view of a display apparatus 100 of the first embodiment. FIG. 2 is a diagram schematically illustrating a configuration of an optical system 10 of the display apparatus 100 illustrated in FIG. 1.

Note that, in FIGS. 1 and 2, a front-back direction relative to the observer wearing a display apparatus is referred to as a direction along a Z axis, a front of the observer wearing the display apparatus, which is one side in the front-back direction, is referred to as a frontside Z1, and a back of the observer wearing the display apparatus, which is the other side in the front-back direction, is referred to as a backside Z2. In addition, a left and right direction relative to the observer wearing the display apparatus is referred to as a direction along an X axis, a right of the observer wearing the display apparatus, which is one side in the left-right direction, is referred to as a right-side X1, and a left of the observer wearing the display apparatus, which is the other side in the left-right direction, is referred to as a left side X2. Further, an upper-lower direction relative to the observer wearing the display apparatus is referred to as a direction along a Y axis, an upside of the observer wearing the display apparatus, which is one side in the upper-lower direction, is referred to as an upper side Y1, and a downside of the observer wearing the display apparatus, which is the other side in the upper-lower direction, is referred to as a lower side Y2.

As illustrated in FIG. 1, the display apparatus 100, which is a head-mounted display, includes a right-eye optical system 10a configured to cause imaging light L0a to be incident on a right eye Ea, and a left-eye optical system 10b configured to cause imaging light L0b to be incident on a left eye Eb. The display apparatus 100 is configured in a glasses-like form, for example. Specifically, the display apparatus 100 further includes a chassis 90 for holding the right-eye optical system 10a and the left-eye optical system 10b. The display apparatus 100 is mounted to the head of the observer by the chassis 90.

The display apparatus 100 includes, as the chassis 90, a frame 91, a temple 92a provided on the right side of the frame 91 and hooked on the right ear of the observer, and a temple 92b provided on the left side of the frame 91 and hooked on the left ear of the observer. The frame 91 includes storage spaces 91s on both sides of the frame 91, where the storage spaces 91s accommodate various parts such as an imaging light projecting device constituting the optical system 10 described below. The temples 92a and 92b are foldably coupled to the frame 91 by hinges 95.

The right-eye optical system 10a and the left-eye optical system 10b have an identical basic configuration. Thus, the right-eye optical system 10a and the left-eye optical system 10b will be described simply as the optical system 10 without being distinguished in the description below.

With reference to FIG. 2, a basic configuration of the optical system 10 of the display apparatus 100 will be described.

As illustrated in FIG. 2, the display apparatus 100 includes an imaging light generating device 31, and the optical system 10 on which imaging light emitted from the imaging light generating device 31 is incident.

The imaging light generating device 31 is configured to generate the imaging light L0. A configuration may be employed in which the imaging light generating device 31 includes a display panel such as an organic electroluminescent display element, for example. The configuration can provide the display apparatus 100 that is compact and can display a high-quality image. A configuration may also be employed in which the imaging light generating device 31 includes an illumination light source (not illustrated) and a display panel such as a liquid crystal display element that modulates illumination light emitted from the illumination light source. The configuration, which allows for a selection of the illumination light source, has an advantage in increasing a degree of flexibility in wavelength characteristics of the imaging light L0.

The imaging light generating device 31 may also include a single display panel that can perform color display. A configuration may also be employed in which the imaging light generating device 31 includes a plurality of display panels corresponding to respective colors and a synthesis optical system that synthesizes imaging light of the respective colors emitted from the plurality of display panels. A configuration may also be employed in which the imaging light generating device 31 causes a micro-mirror device to modulate laser light.

The optical system 10 includes a first optical unit L10 having positive power, a second optical unit L20 including a first diffraction element 50 having a positive power, a third optical unit L30 having positive power, and a fourth optical unit L40 having positive power and including a second diffraction element 70 forming an exit pupil, where the first optical unit L10, the second optical unit L20, the third optical unit L30, and the fourth optical unit L40 are orderly aligned along an optical path of the imaging light L0.

In the first embodiment, the first optical unit L10 having positive power includes a projection optical system 32 and a mirror 40. The projection optical system 32 includes a first lens 326, a second lens 327, and the mirror 40. The first lens 326 and the second lens 327 are arranged in this order from a side near the imaging light generating device 31. The first lens 326 has a rotationally symmetric shape. The second lens 327 has a free curved shape. Note that in FIG. 2, although the example is exemplified in which two pieces of the lenses 326 and 327 are included in the projection optical system 32, the number of the lenses is not limited to this, and the projection optical system 32 may include three or more lenses. The respective lenses may also be integrally bonded together to form the projection optical system 32.

The mirror 40 is disposed halfway in an optical path reaching the first diffraction element 50 from the projection optical system 32. The projection optical system 32 forms an intermediate image (a first intermediate image P1) on a reflection surface 400 of the mirror 40 or at a position near the reflection surface. The mirror 40, which includes the reflection surface 400 forming a concave curved surface, has positive power. When the reflection surface 400 of the mirror 40 has positive power, the mirror 40 may be included as a constituting element of the projection optical system 32.

Note that the reflection surface 400 of the mirror 40 may form a flat surface, and the mirror 40 may not have power.

The second optical unit L20 having positive power is constituted by the first diffraction element 50, having positive power, of a reflection type. The first diffraction element 50 is constituted by a reflection-type volume hologram. A configuration of the first diffraction element 50 will be described later.

The third optical unit L30 having positive power is constituted by a light-guiding system 60. The light-guiding system 60, which includes a mirror 62 including a reflection surface 620 with its center being concave with respect to the peripheral portion, has positive power. The reflection surface 620 of the mirror 62 is inclined diagonally toward the front-back direction. The reflection surface 620 may be constituted by a spherical surface, an aspheric surface, or a free-form surface, and in the first embodiment, the reflection surface 620 is constituted by a free-form surface. The mirror 62 may be constituted by a total reflection mirror or may be constituted by a half mirror. The mirror 62, when constituted by the half mirror, can widen a range in which external light is visually recognized.

The fourth optical unit L40 having positive power is constituted by the second diffraction element 70 having positive power. The second diffraction element 70 is constituted by a reflection-type volume hologram. A configuration of the second diffraction element 70 will be described later.

In the optical system 10, focusing on an advancing direction of the imaging light L0, the imaging light generating device 31 emits the imaging light L0 toward the projection optical system 32. The projection optical system 32 emits the imaging light L0 being incident via the mirror 40 toward the first diffraction element 50. The first diffraction element 50 emits the imaging light L0 being incident, toward the light-guiding system 60. The light-guiding system 60 emits the imaging light L0 being incident, toward the second diffraction element 70. The second diffraction element 70 emits the imaging light L0 being incident, toward eyes E of the observer.

In the optical system 10 of the first embodiment, a pupil R0 is formed at a position between the lens 326 and the lens 327 of the first optical unit L10, a pupil R1 is formed at a position near the third optical unit L30, a second intermediate image P2 of imaging light is formed at a position between the third optical unit L30 and the fourth optical unit L40, and the fourth optical unit L40 renders the imaging light into parallel beams to form an exit pupil R2.

The first intermediate image P1 and the second intermediate image P2 illustrated in FIG. 2 are intermediate images of the imaging light diffused in a horizontal direction along the drawing sheet. The imaging light L0 emitted from the imaging light generating device 31 is diffused in the vertical direction orthogonal to the drawing sheet of FIG. 2 as well as in the horizontal direction, and thus there is also present an intermediate image of the imaging light L0 diffused in the vertical direction. In the first embodiment, an intermediate image in the vertical direction is present at a position near an intermediate image in the horizontal direction. Note that, in the optical system 10 of the first embodiment, although the first intermediate image P1 is formed at a position near the mirror 40, the first intermediate image P1 may be formed inside the first optical unit L10 (the projection optical system 32).

Figure 3:
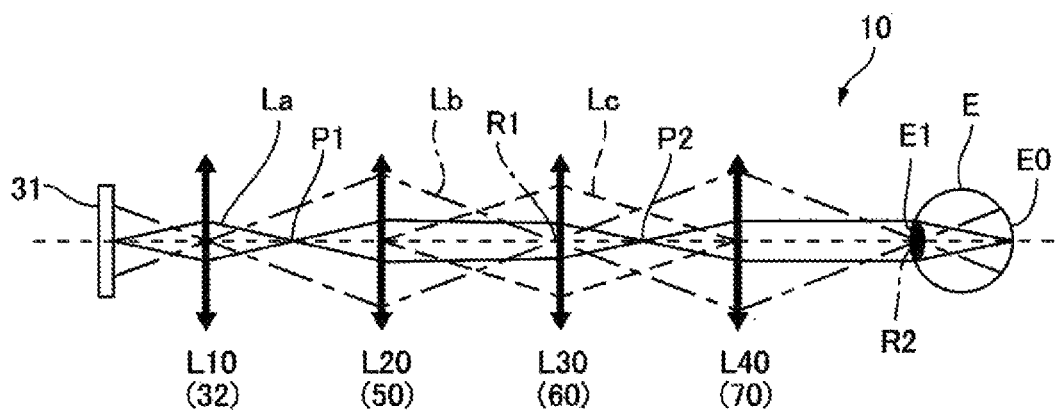
FIG. 3 is an explanatory light-beam diagram illustrating an action of an optical system.

FIG. 3 is a light-beam diagram in the optical system 10 of the first embodiment. In FIG. 3, the respective optical units aligned along an optical axis are indicated by thick arrows.

Further, a light beam emitted from one pixel of the imaging light generating device 31 is indicated by a solid line La, a main light beam emitted from an end portion of the imaging light generating device 31 is indicated by a dot-and-dash line Lb, and a position at which the light beam is in a conjugated relationship with the first diffraction element 50 is indicated by a long dashed line Lc. Here, the term "intermediate image" refers to a location at which light beams (the solid lines La) emitted from one pixel converge, and the term "pupil" refers to a location at which main light beams (the dot-dash lines Lb) of respective view angles converge. Further, FIG. 3 illustrates an advancement of light emitted from the imaging light generating device 31. In FIG. 3, all of the optical units are illustrated as a transmissive-type to simplify the figure.

As illustrated in FIG. 3, the optical system 10 of the first embodiment includes, along an optical path of the imaging light emitted from the imaging light generating device 31, the projection optical system 32, in which there are provided the first optical unit L10 having positive power, the second optical unit L20 having positive power and including the first diffraction element 50, the third optical unit L30 having positive power and including the light-guiding system 60, and the fourth optical unit L40 having positive power and including the second diffraction element 70.

The focal length of the first optical unit L10 is L/2. All of the focal lengths of the second optical unit L20, the third optical unit L30, and the fourth optical unit L40 are L. Thus, an optical distance from the second optical unit L20 to the third optical unit L30 is equal to the optical distance from the third optical unit L30 to the fourth optical unit L40.

In the optical system 10, the first intermediate image P1 of the imaging light is formed at a position between the first optical unit L10 and the third optical unit L30, the pupil R1 is formed at a position between the second optical unit L20 and the fourth optical unit L40, the second intermediate image P2 of the imaging light is formed at a position between the third optical unit L30 and the fourth optical unit L40, and the fourth optical unit L40 renders the imaging light into parallel beams to form the exit pupil R2.

At this time, the third optical unit L30 arbitrarily control the imaging light emitted from the second optical unit L20 to be converted into divergent light, or convergent light, or parallel light, to cause these beams of light to be incident on the fourth optical unit L40. The second optical unit L20 causes the imaging light emitted from the first optical unit L10 to be incident, as the convergent light, on the third optical unit L30. In the optical system 10, the pupil R1 is formed at a position near the third optical unit L30, which is a position between the second optical unit L20 and the fourth optical unit L40. The position near the third optical unit L30 refers to a position between the second optical unit L20 and the third optical unit L30, which is a position nearer the third optical unit L30 than the second optical unit L20, or a position between the third optical unit L30 and the fourth optical unit L40, which is a position nearer the third optical unit L30 than the fourth optical unit L40.

The third optical unit L30 causes, of the imaging light from one point of the imaging light generating device 31, light having a peripheral wavelength deviated from a specific wavelength by being deflected by the first diffraction element 50 to be incident on a predetermined range in the second diffraction element 70. That is, the first diffraction element 50 is in a conjugated or a substantially conjugated relationship with and the second diffraction element 70. Here, the absolute value of magnification of projection on the second diffraction element 70 by the third optical unit L30 of the first diffraction element 50 ranges from 0.5 times to 10 times. It is preferred that the absolute value of the magnification range from 1 time to 5 times.

Thus, according to the optical system 10 of the first embodiment, the first intermediate image P1 of the imaging light is formed at a position between the projection optical system 32 and the light-guiding system 60, the pupil R1 is formed at a position near the light-guiding system 60, the second intermediate image P2 of the imaging light is formed at a position between the light-guiding system 60 and the second diffraction element 70, and the second diffraction element 70 renders the imaging light into parallel beams to form the exit pupil R2.

In the optical system 10 of the first embodiment, the first intermediate image P1 is formed at a position between the first optical unit L10 (the projection optical system 32) and the second optical unit L20 (the first diffraction element 50).

According to the optical system 10 of the first embodiment, four conditions (Conditions 1, 2, 3, and 4) given below are satisfied.

Condition 1: A light beam emitted from one point of the imaging light generating device 31 forms an image as one point in a retina E0.

Condition 2: An incident pupil of the optical system is conjugated with a pupil of an eyeball.

Condition 3: The first diffraction element 50 and the second diffraction element 70 are appropriately arranged to compensate for a peripheral wavelength.

Condition 4: The first diffraction element 50 is in a conjugated or a substantially conjugated relationship with the second diffraction element 70.

More specifically, as recognizable from the solid line La illustrated in FIG. 3, Condition 1 that a light beam emitted from one point of the imaging light generating device 31 forms an image as one point at the retina E0 is satisfied, to thus allow the observer to visually recognize one pixel. As also recognizable from the solid line La illustrated in FIG. 3, Condition 2 that the incident pupil of the optical system 10 is in a conjugated relationship with the pupil E1 of the eye E (a conjugation of the pupil) is satisfied, to thus make it possible to visually recognize the entire region of the image generated by the imaging light generating device 31.

Further, Condition 3 that the first diffraction element 50 and the second diffraction element 70 are appropriately arranged to compensate for the peripheral wavelength is satisfied, to thus make it possible to cancel, by performing wavelength compensation, a color aberration occurring at the second diffraction element 70. As also recognizable from the long dashed line Lc illustrated in FIG. 3, Condition 4 that the first diffraction element 50 is in a conjugated or a substantially conjugated relationship with the second diffraction element 70 is satisfied, to thus make it possible to allow light beams to be incident on a location at which the interference fringe is identical in the first diffraction element 50 and the second diffraction element 70, and to perform wavelength compensation in an appropriate manner. This makes it possible to suppress a deterioration in resolution of the imaging light.

A configuration of the second diffraction element 70 will be described below.

Figure 4:
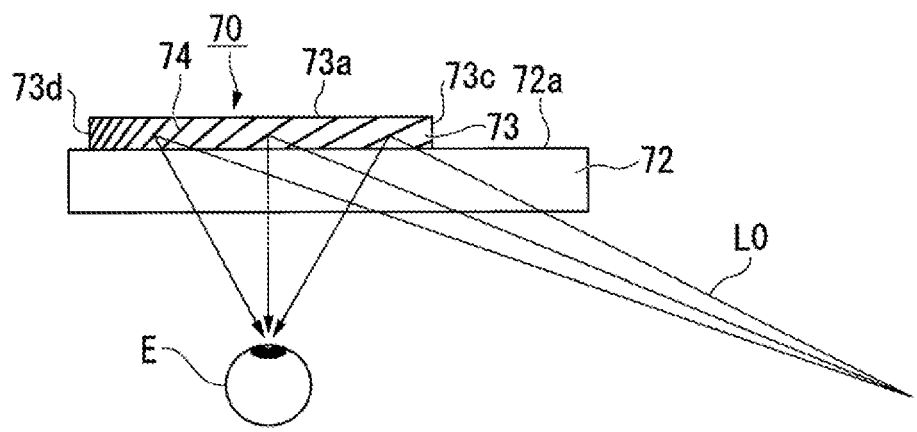
FIG. 4 is a cross-sectional diagram illustrating a second diffraction element.
Figure 5:
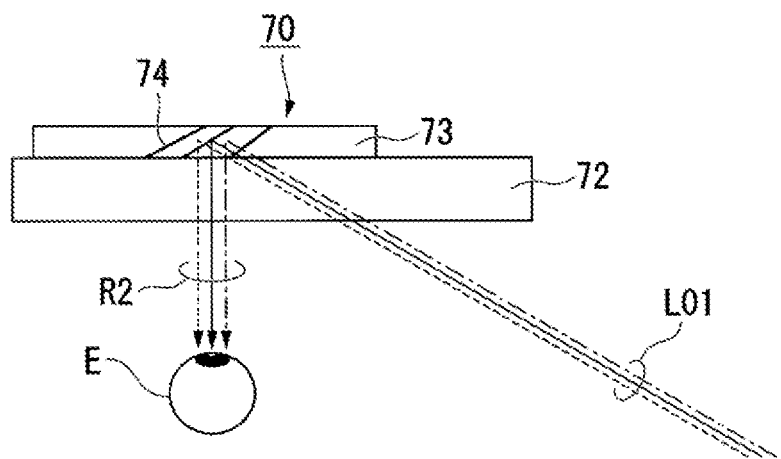
FIG. 5 is an explanatory light-beam diagram illustrating an action of a second diffraction element.
Figure 6:
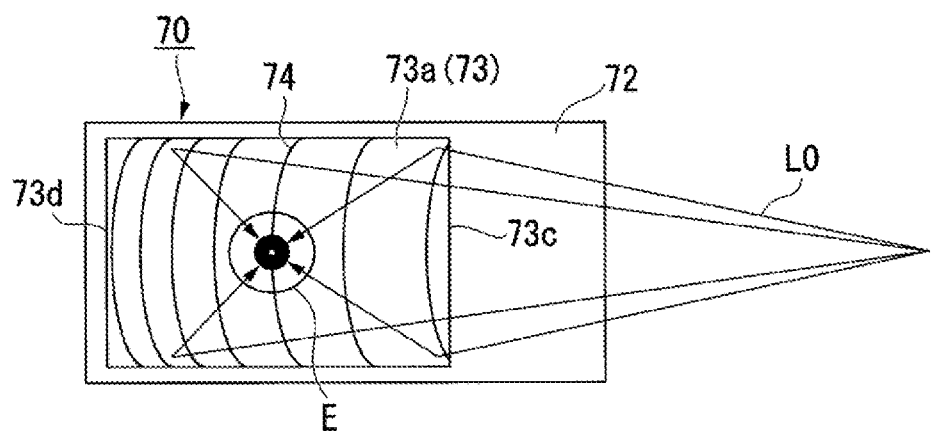
FIG. 6 is a front diagram illustrating a second diffraction element.

FIG. 4 is a cross-sectional diagram illustrating the second diffraction element 70. FIG. 5 is an explanatory light-beam diagram illustrating an action of the second diffraction element 70. FIG. 6 is a front diagram illustrating the second diffraction element 70.

As illustrated in FIG. 4, the second diffraction element 70 includes a base material 72 and a holographic photosensitive layer 73 formed on a first surface 72a of the base material 72. The second diffraction element 70 is a partial reflection-type diffraction optical element constituted by a reflection-type volume hologram element. Thus, in addition to the imaging light L0, external light is incident via the second diffraction element 70 on the eyes E, to allow the observer to recognize an image in which the imaging light L0 formed by the imaging light generating device 31 is superimposed with the external light (background).

As illustrated in FIG. 2, the second diffraction element 70 faces the eyes E of the observer, and an incident surface 70a of the second diffraction element 70 on which the imaging light L0 is incident forms a concave surface being concave in a direction away from the eyes E. In other words, the incident surface 70a forms a shape having a central portion being concave and curved with respect to the peripheral portion in an incident direction of the imaging light L0. This makes it possible to efficiently converge the imaging light L0 toward the eyes E of the observer. Note that the second diffraction element 70 may be planarly formed like the second diffraction element 70 that is planarly illustrated in FIG. 4.

The second diffraction element 70 has interference fringes 74 having a pitch corresponding to the specific wavelength. The interference fringes 74 are recorded in the holographic photosensitive layer 73 as regions having mutually different refractive indices being formed in stripes. The interference fringes 74 are inclined in one direction with respect to the first surface 72a in a manner corresponding to a specific incident angle. In case of the first embodiment, the interference fringes 74 are inclined in a direction from lower left toward upper right in FIG. 4. This allows the second diffraction element 70 to diffract and deflect the imaging light L0 in a predetermined direction, and allows the second diffraction element 70 to introduce the imaging light L0 to the eyes E of the observer. The specific wavelength and the specific incident angle correspond to a wavelength and an incident angle of the imaging light L0, respectively. The interference fringes 74 can be formed by performing interference exposure on the holographic photosensitive layer 73 by using reference light and object light.

The second diffraction element 70 has, in a cross-sectional view of the volume hologram, the interference fringes 74 continuously varying in pitch and inclination from one end toward the other end of the second diffraction element 70. More specifically, the interference fringes 74 have a relatively large pitch at an incident side of the imaging light L0, that is, at a first end portion 73c on a side near the third optical unit L30, and have a relatively small pitch at a second end portion 73d on a side far from the third optical unit L30. The pitch gradually decreases from the first end portion 73c to the second end portion 73d. In other words, the interference fringes 74 vary in density from coarse to dense from the first end portion 73c toward the second end portion 73d. Note that the cross-sectional view of the volume hologram refers to viewing an XZ plane in FIG. 1, that is, a cross-section when cutting the volume hologram along a horizontal plane in a state where the observer wears the display apparatus.

In addition, the inclinations of the interference fringes 74 with respect to the first surface 72a is relatively small on a side of the first end portion 73c, and is relatively large at the second end portion 73d. The inclination gradually increases from the first end portion 73c toward the second end portion 73d. Note that the term "inclination" herein used is defined as an angle formed by the interference fringes 74 and the first surface 72a.

As illustrated in FIG. 6, in a front view of the volume hologram, the interference fringes 74 are formed in a substantially concentric circle-like shape having a center on an outer side from the second diffraction element 70. The pattern of the interference fringes is viewed as an arcuate shape at a first surface 73a of the holographic photosensitive layer 73. In addition, the second diffraction element 70 has, in a front view of the volume hologram, the interference fringes 74 continuously varying in curvature radius from one end toward the other end of the second diffraction element 70. More specifically, the curvature radii of the interference fringes 74 gradually increase from the first end portion 73c toward the second end portion 73d. Accordingly, even light beams forming a view angle spreading in a direction perpendicular to planes of the drawing sheets of FIGS. 2 and 4 form a small and narrowed exit pupil, preventing an occurrence of color unevenness and luminance unevenness in an image. Note that the phase "in a front view of the volume hologram" refers to viewing the volume hologram in a direction along the Z axis in FIG. 1, that is, in a front-back direction in a state where the observer wears the display apparatus.

In case of the first embodiment, the first diffraction element 50 is constituted by a volume hologram as in the second diffraction element 70. That is, the first diffraction element 50 has interference fringes continuously varying in pitch and inclination from one end toward the other end of the first diffraction element 50. The interference fringes have a relatively small pitch at a first end 50c (see FIG. 2) on a side from which a distance from the mirror 40 is short, and have a relatively large pitch at a second end 50d (see FIG. 2) on a side from which a distance from the mirror 40 is long. The pitch gradually increases from the first end 50c to the second end 50d. In other words, the interference fringes vary in density from dense to coarse from the first end 50c toward the second end 50d.

As illustrated in FIG. 2, on the second diffraction element 70, light beams emitted from the third optical unit L30 are obliquely incident at a large incident angle. Accordingly, as illustrated in FIG. 4, a part of the light beams passing through the interference fringes 74 on a side near the third optical unit L30 of the first end portion 73c is incident on the interference fringes 74 on a side far from the third optical unit L30 of the second end portion 73d. In this case, supposing that the second diffraction element 70 is constituted by a known diffraction element having interference fringes of a constant pitch, light beams being incident on the second diffraction element 70 is reflected by a large light amount on the side of the first end portion 73c, and is reflected by a small light amount on a side of the second end portion 73d, thus facilitating an occurrence of luminance unevenness in an image.

In contrast to this, in the second diffraction element 70 of the first embodiment, when the optical system having an action illustrated in FIG. 3 attempts to establish the optical system of an overall configuration illustrated in FIG. 2, it is desirable that the interference fringes 74 be in accordance with Bragg's law as much as possible for the entirety of the imaging light L0 forming the view angle. This allows the second diffraction element 70 to be configured to have the interference fringes 74 continuously varying in both pitch and inclination from one end toward the other end. In case of the first embodiment, the second diffraction element 70 has the interference fringes 74 gradually decreasing in pitch from the first end portion 73c toward the second end portion 73d, an amount of light reflected on the side of the first end portion 73c and the amount of light reflected on the side of the second end portion 73d are likely to become uniform compared to when using a known diffraction element. This prevents the second diffraction element 70 of the first embodiment from causing luminance unevenness in an image.

Further, according to a configuration of the interference fringes 74 of the first embodiment, compared to known interference fringes, the exit pupil R2 becomes minimized, causing light beams L01 having a narrow wavelength distribution to form the exit pupil R2, as illustrated in FIG. 5. This makes it possible to suppress the luminance unevenness in an image. As such, according to the first embodiment, the display apparatus 100 having less luminance unevenness and color unevenness in an image can be achieved.

Second Embodiment

A second embodiment of the present disclosure will be described below with reference to FIGS. 7 and 8.

A display apparatus of the second embodiment is similar in basic configuration to the first embodiment, and is different in configuration of the second diffraction element from the first embodiment. Thus, an overall configuration of the display apparatus will not be described.

Figure 7:
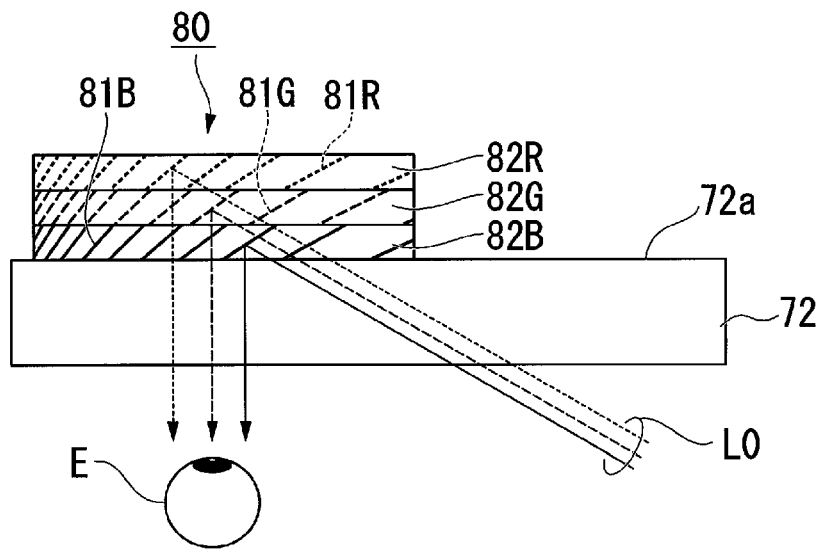
FIG. 7 is a cross-sectional diagram illustrating a second diffraction element of a second embodiment.

FIG. 7 is a cross-sectional diagram illustrating a second diffraction element of the second embodiment.

In FIG. 7, the constituent elements common to those in the drawings used in the first embodiment are denoted with the same reference signs, and a detailed description is omitted.

As illustrated in FIG. 7, a second diffraction element 80 has a first interference fringe 81B corresponding to a first light within the first wavelength band, a second interference fringe 81G corresponding to a second light within the second wavelength band different from the first wavelength band, and a third interference fringe 81R corresponding to a third light within the third wavelength band different from both the first wavelength band and the second wavelength band. In case of the second embodiment, the second diffraction element 80 has a configuration in which a first diffraction layer 82B having the first interference fringe 81B, a second diffraction layer 82G having the second interference fringe 81G, and a third diffraction layer 82R having the third interference fringe 81R, are layered.

In the second embodiment, the imaging light L0 is light for color display and the display apparatus displays an image of full color. Accordingly, in the second diffraction element 80, there are formed three interference fringes of the first interference fringe 81B, the second interference fringe 81G, and the third interference fringe 81R each having, as the center, the pitch corresponding to the specific wavelength. For example, the first interference fringe 81B is an interference fringe that diffracts blue light, and is formed, as the center, with a pitch corresponding to, for example, a wavelength of 460 nm in the first wavelength band from 400 to 500 nm of a blue color region. The second interference fringe 81G is an interference fringe that diffracts green light, and is formed, as the center, with a pitch corresponding to, for example, a wavelength of 535 nm in the second wavelength band from 500 to 580 nm of a green color region. The third interference fringe 81R is an interference fringe that diffracts red light, and is formed, as the center, with a pitch corresponding to, for example, a wavelength of 615 nm in the third wavelength band from 580 to 700 nm of a red color region.

Figure 8:
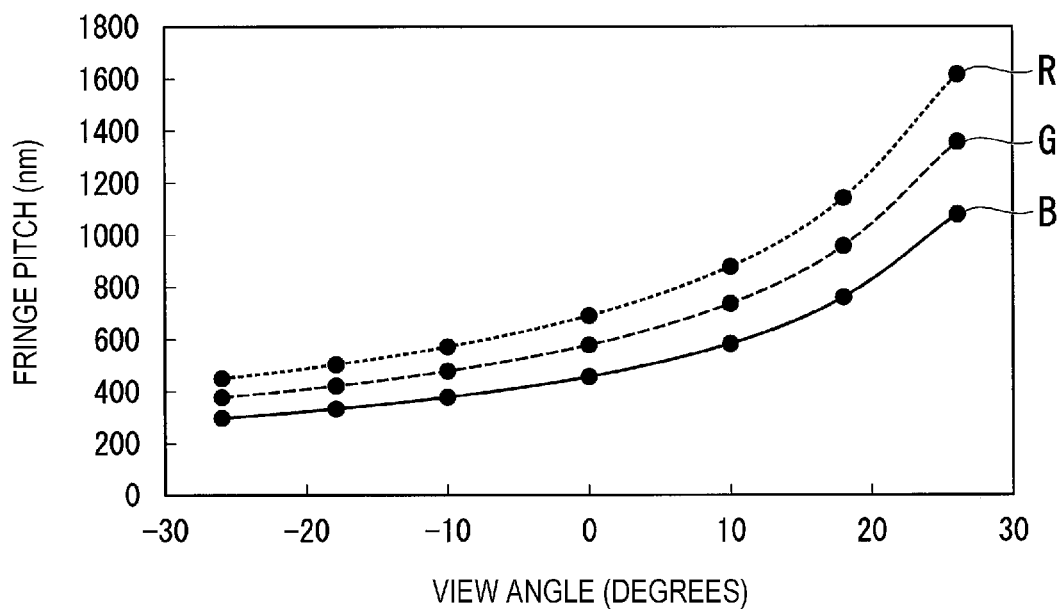
FIG. 8 is a graph illustrating a relationship between a view angle with respect to each color light and an interference fringe pitch.

FIG. 8 is a graph illustrating an example of the relationship between a view angle with respect to each of the blue light B, the green light G, and the red light R and an interference fringe pitch.

In FIG. 8, the horizontal axis indicates a view angle (degree), and the vertical axis indicates the interference fringe pitch (nm).

As illustrated in FIG. 8, a longer wavelength of light leads to a longer interference fringe pitch with respect to light with an identical view angle, and a greater variation rate of the interference fringe pitch with respect to the view angle (a gradient of the graph). Thus, it suffices that such a relationship be applied to setting a pitch of each of the first interference fringe 81B, the second interference fringe 81G, and the third interference fringe 81R.

In case of the second embodiment, the first diffraction layer 82B has the first interference fringes 81B continuously varying in pitch and inclination from one end toward the other end of the second diffraction element 80. In addition, the second diffraction layer 82G has the second interference fringes 81G continuously varying in pitch and inclination from one end toward the other end of the second diffraction element 80. Further, the third diffraction layer 82R has the third interference fringes 81R continuously varying in pitch and inclination from one end toward the other end of the second diffraction element 80.

Other configurations of the display apparatus are as in the display apparatus of the first embodiment.

In the second embodiment as well, the continuous variation of the pitches and inclinations of the interference fringes 81B, 81G, and 81R makes it possible to achieve a display apparatus with less luminance unevenness and color unevenness in an image, and compatible with a full color display.

In addition, in case of the second embodiment, the first interference fringe 81B, the second interference fringe 81G, and the third interference fringe 81R that differ in pitch and inclination from one another can be sequentially formed, thus making it possible to form the interference fringes 81B, 81G, and 81R with high accuracy.

Third Embodiment

A third embodiment of the present disclosure will be described below with reference to FIG. 9.

A display apparatus of the third embodiment is similar in basic configuration to the first embodiment, and is different in configuration of the second diffraction element from the first embodiment. Thus, an overall configuration of the display apparatus will not be described.

Figure 9:
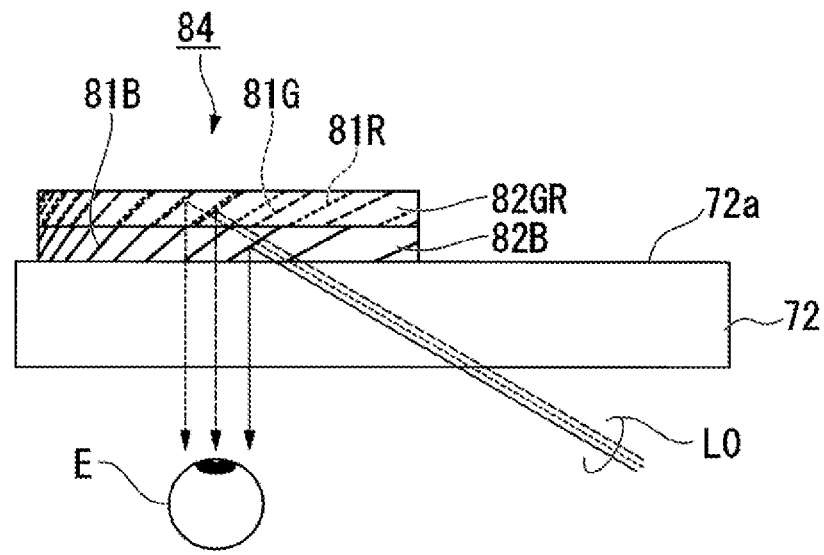
FIG. 9 is a cross-sectional diagram illustrating a second diffraction element of a third embodiment.

FIG. 9 is a cross-sectional diagram illustrating the second diffraction element of the third embodiment.

In FIG. 9, the constituent elements common to those in the drawings used in the above-described embodiments are denoted with the same reference signs, and a detailed description is omitted.

As illustrated in FIG. 9, a second diffraction element 84 of the third embodiment, as in the second diffraction element 80 of the second embodiment, has the first interference fringe 81B, the second interference fringe 81G, and the third interference fringe 81R. In case of the third embodiment, the second diffraction element 84 has a configuration in which the first diffraction layer 82B having the first interference fringe 81B, and a second diffraction layer 82GR having the second interference fringe 81G and the third interference fringe 81R that are superimposed within one piece of layer, are layered.

In case of the third embodiment, the first diffraction layer 82B has the first interference fringes 81B continuously varying in pitch and inclination from one end toward the other end of the second diffraction element 84. In addition, the second diffraction layer 82GR has the second interference fringes 81G continuously varying in pitch and inclination, and has the third interference fringes 81R continuously varying in pitch and inclination from one end toward the other end of the second diffraction element 84. Other configurations of the display apparatus are as in the display apparatus of the first embodiment.

In the second embodiment as well, the continuous variation of the pitches and inclinations of the interference fringes 81B, 81G, and 81R makes it possible to achieve a display apparatus with less luminance unevenness and color unevenness in an image, and compatible with a full color display.

Further, in case of the third embodiment, three pieces of the interference fringes 81B, 81G, and 81R are formed within two pieces of the diffraction layers 82B and 82GR, thus making it possible to thin the second diffraction element 84.

Modification Example

The second diffraction element may have the following configuration.

Figure 10:
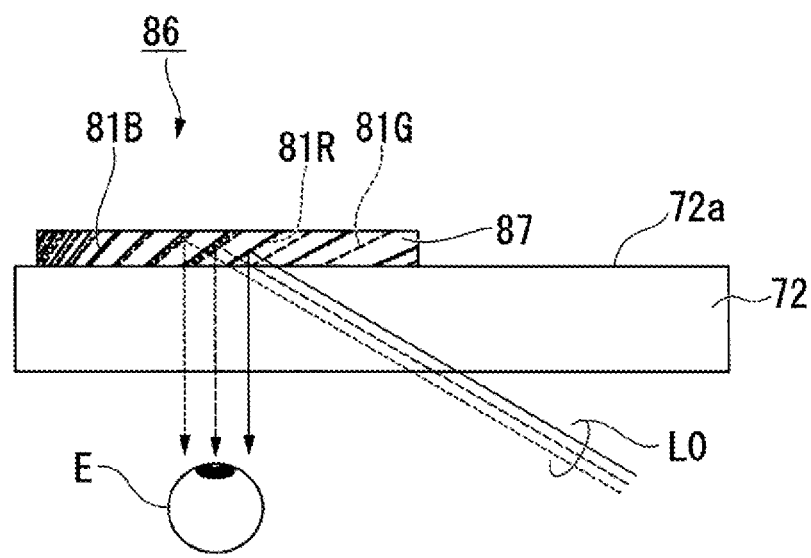
FIG. 10 is a cross-sectional diagram illustrating a second diffraction element of a modification example.

FIG. 10 is a cross-sectional diagram illustrating the second diffraction element of the modification example.

In FIG. 10, the constituent elements common to those in the drawings used in the above-described embodiments are denoted with the same reference signs, and a detailed description is omitted.

As illustrated in FIG. 10, a second diffraction element 86 of the modification example, as in the second diffraction element 84 of the third embodiment, has the first interference fringe 81B, the second interference fringe 81G, and the third interference fringe 81R. In case of the modification example, the second diffraction element 86 has a configuration in which the first interference fringe 81B, the second interference fringe 81G, and the third interference fringe 81R are superimposed within one piece of a diffraction layer 87.

In the modification example as well, advantageous effects as in the third embodiment can be achieved, such as an achievement of the display apparatus with less luminance unevenness and color unevenness in an image, and compatible with a full color display, and a thinning of the second diffraction element.

Note that, in the second diffraction elements 84 and 86 of the third embodiment and the modification example, two or more interference fringes are superimposed within one piece of diffraction layer, and thus, supposing that the entirety of two or more pieces of the interference fringes 81B, 81G, and 81R that are superimposed is regarded as one piece of interference fringe, there exists a location having a locally narrow pitch even in a region on a side near the first end portions of the second diffraction elements 84 and 86, as illustrated in FIG. 10, for example. Thus, the pitches and inclinations of all of the respective fringes adjacent to each other are not necessarily in continuous variation. However, when individually viewing the interference fringes 81B, 81G, and 81R each corresponding to light within each of the wavelength bands, the pitches and inclinations continuously vary from one end toward the other end.

Note that the technical scope of the present disclosure is not limited to the above-described embodiments, and various modifications can be made to the above-described embodiments without departing from the spirit and gist of the present disclosure.

For example, although the display apparatuses of the above-described embodiments include the first diffraction element having the interference fringes continuously varying in pitch and inclination from one end toward the other end, the pitches and inclinations of the interference fringes may not necessarily be in continuous variation for the first diffraction element. Furthermore, the specific configurations of the display apparatuses exemplified in the above-described embodiments, such as the number, arrangement, shape, and the like of each of the constituent elements may be appropriately modified.

Examples of the display apparatuses described in the above-described embodiments also include a head-up display, in addition to the head-mounted display.

What is claimed is:

1. A display apparatus, comprising:
an imaging light generating device; and
an optical system on which imaging light emitted from the imaging light generating device is incident, wherein
the optical system includes a first optical unit having positive power, a second optical unit having positive power and including a first diffraction element, a third optical unit having positive power, and a fourth optical unit having positive power and including a second diffraction element forming an exit pupil due to the imaging light,
the first optical unit, the second optical unit, the third optical unit, and the fourth optical unit being aligned in order along an optical path of the imaging light, and
the second diffraction element is constituted of a volume hologram and has, in a cross-sectional view of the volume hologram, interference fringes continuously varying in pitch and inclination thereof from one end toward another end of the second diffraction element, and the second diffraction element has, in a front view of the volume hologram, interference fringes continuously varying in curvature radius thereof from the one end toward the other end of the second diffraction element, and wherein on the optical path, a first intermediate image of the imaging light is formed at a position between the first optical unit and the third optical unit,
a pupil is formed at a position between the second optical unit and the fourth optical unit,
a second intermediate image of the imaging light is formed at a position between the third optical unit and the fourth optical unit, and
the exit pupil is formed on an opposite side of the fourth optical unit from the third optical unit.

2. The display apparatus according to claim 1, wherein the second diffraction element has:
a first interference fringe corresponding to first light within a first wavelength band;
a second interference fringe corresponding to second light within a second wavelength band that is different from the first wavelength band; and
a third interference fringe corresponding to third light within a third wavelength band that is different from both the first wavelength band and the second wavelength band.

3. The display apparatus according to claim 2, wherein the second diffraction element has a configuration, in which a first diffraction layer having the first interference fringe, a second diffraction layer having the second interference fringe, and a third diffraction layer having the third interference fringe are layered.

4. The display apparatus according to claim 2, wherein the second diffraction element has a configuration, in which among the first interference fringe, the second interference fringe, and the third interference fringe, at least two of the interference fringes are superimposed within one diffraction layer.

5. The display apparatus according to claim 1, wherein the interference fringes have a relatively large pitch on a side near the third optical unit and have a relatively small pitch on a side far from the third optical unit.

6. The display apparatus according to claim 1, wherein the first diffraction element has, in a cross-sectional view, interference fringes continuously varying in pitch and inclination thereof from the one end toward the other end of the first diffraction element.

* * * * *